United States Patent
Ye et al.

(10) Patent No.: US 12,323,256 B2
(45) Date of Patent: *Jun. 3, 2025

(54) DYNAMIC UPLINK CONTROL CHANNEL CARRIER SWITCHING

(71) Applicant: APPLE INC., Cupertino, CA (US)

(72) Inventors: Sigen Ye, San Diego, CA (US);
Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/905,296

(22) PCT Filed: Oct. 1, 2021

(86) PCT No.: PCT/CN2021/122494
§ 371 (c)(1),
(2) Date: Aug. 30, 2022

(87) PCT Pub. No.: WO2023/050450
PCT Pub. Date: Apr. 6, 2023

(65) Prior Publication Data
US 2024/0235748 A1   Jul. 11, 2024

(51) Int. Cl.
*H04L 1/1829* (2023.01)
*H04L 5/00* (2006.01)

(52) U.S. Cl.
CPC .......... *H04L 1/1861* (2013.01); *H04L 1/1854* (2013.01); *H04L 5/0055* (2013.01)

(58) Field of Classification Search
None
See application file for complete search history.

(56) References Cited

U.S. PATENT DOCUMENTS

| 2020/0022175 A1 | 1/2020 | Xiong et al. |
| 2021/0144716 A1 | 5/2021 | Choi et al. |
| 2024/0196390 A1* | 6/2024 | Ye ..................... H04W 72/1268 |

FOREIGN PATENT DOCUMENTS

CN          113287355 A          8/2021

OTHER PUBLICATIONS

3GPP, Moderator summary #1 on HARQ-ACK feedback enhancements for NR Rel-17 URLLC/IIoT, e-Meeting, Aug. 16-27, 2021, R1-2106639, 1-67 (Year: 2021).*

(Continued)

*Primary Examiner* — Kouroush Mohebbi
(74) *Attorney, Agent, or Firm* — Dorsey & Whitney LLP

(57) ABSTRACT

PUCCH carrier switching includes decoding an RRC configuration that indicates a reference cell having a reference cell slot numerology. A reference cell slot is determined for PUCCH transmissions based on the reference cell slot numerology. The determined slot is used for transmission of an SR, CSI, or HARQ-ACK, A DCI indicating a candidate target PUCCH cell having a candidate target PUCCH cell slot numerology and a slot of the candidate target PUCCH cell is decoded. A target PUCCH cell having a target PUCCH cell slot numerology is determined for transmitting the SR, the CSI, or the HARQ-ACK. The determined slot is mapped to a corresponding slot of the target PUCCH cell. A PUCCH resource is determined for transmitting the SR, the CSI, or the HARQ-ACK using the corresponding slot of the target PUCCH cell. The PUCCH resource determination is based on a PUCCH configuration of the target PUCCH cell.

14 Claims, 9 Drawing Sheets

(56) References Cited

OTHER PUBLICATIONS

Moderator (Nokia), "Moderator summary #1 on HARQ-ACK feedback enhancements for NR Rel-17 URLLC/IoT", R1-2106639, 3GPP TSG-RAN WG1 Meeting #106-e, e-Meeting, Agenda Item 8.3.1.1, Aug. 16-27, 2021, 68 pages.
PCT/CN2021/122494, International Search Report and Written Opinion, Jun. 23, 2022, 9 pages.
Ericsson, "HARQ-ACK Enhancements for IIoT/URLLC", R1-2106678, 3GPP TSG-RAN WG1 Meeting #106-e, e- Meeting, Agenda Item 8.3.1.1, Aug. 16-27, 2021, 22 pages.
Moderator (Nokia), "Moderator summary #3 on HARQ-ACK feedback enhancements for NR Rel-17 URLLC/IIoT", R1-2108546, 3GPP TSG-RAN WG1 Meeting #106-e e-Meeting, Agenda Item 8.3.1.1, Aug. 16-27, 2021, 265 pages.
U.S. Appl. No. 17/905,215, Notice of Allowance, Apr. 29, 2025, 8 pages.

\* cited by examiner

DYNAMIC UPLINK CONTROL CHANNEL CARRIER SWITCHING

TECHNICAL FIELD

This application relates generally to wireless communication systems, including uplink control channel carrier switching.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR. RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
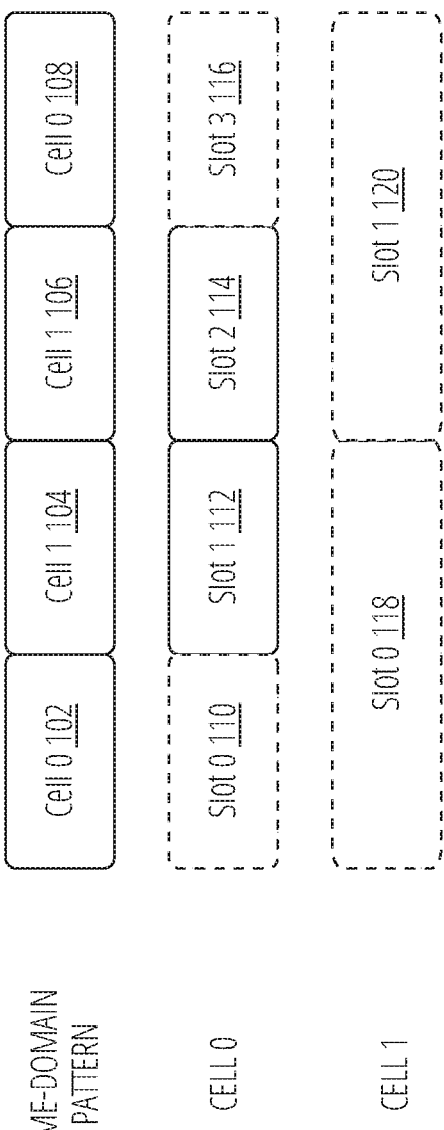
FIG. 1 illustrates a time-domain pattern in relation to reference cell slots and target PUCCH cell slots in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, 3GPP Technical Specification Group Radio Access Network (TSG RAN) WG1 (RAN1) (i.e., Radio Layer 1 or Physical layer) agreements have included support for physical uplink control channel (PUCCH) carrier switching based on a dynamic indication in downlink control information (DCI) and semi-static configurations. Details regarding such support, however, are not yet clear. For instance, the applicability of dynamic and/or semi-static means may be further explored. The goal for any such support may include a minimum impact to already in-place specifications.

Notably, dynamic indication and/or semi-static configuration may be subject to separate UE capabilities. In addition, semi-static PUCCH carrier switching configuration operation may be based on radio resource control (RRC) configured PUCCH cell timing patterns of applicable PUCCH cells, and may support PUCCH carrier switching across cells with different numerologies. Additional rules potentially may also apply to support PUCCH carrier switching across cells with different numerologies. Furthermore, the following details may also be further studied: 1. A maximum number of PUCCH cells; 2. Whether and how to support joint operation of dynamic and semi-static carrier switching for a UE; and/or 3. Whether and how to support joint operation of PUCCH carrier switching and semi-persistent scheduling (SPS) hybrid automatic repeat request-acknowledgment (HARQ-ACK) deferral. In addition, for PUCCH carrier switching based on a dynamic indication in DCI scheduling a PUCCH, the physical downlink shared channel (PDSCH) to HARQ-ACK offset k1 may be interpreted based on the numerology of the dynamically indicated target PUCCH cell, as further discussed below.

Other RAN1 agreements include: 1. For PUCCH carrier switching, the PUCCH configuration (i.e. pucch-Config/PUCCH-ConfigurationList) may be per uplink (UL) bandwidth part (BWP) (i.e. per candidate cell and UL BWP of that specific candidate cell). Channel state information (CSI) and scheduling requests (SRs) associated with such may be further studied; and 2. Semi-static PUCCH carrier switching may be applicable to all uplink control information (UCI) types, including HARQ-ACK, SR, and CSI.

In addition, the following RAN proposals may be applicable to the solutions described herein: 1. For PUCCH carrier switching based on dynamic indication in DCI, a new dedicated DCI field may be introduced for the DCI scheduling PDSCH to indicate a target PUCCH cell; and 2. A UE may not expect overlapping PUCCH slots with dynamic PUCCH cell indication on more than one carrier. For example, in FIG. 1 (as further described herein), the UE does not expect to receive one DCI indicating a PUCCH in Slot 0 on Cell 0, and another DCI indicating a PUCCH in Slot 0 on Cell 1. Such a restriction may reduce the complexity associated with handling overlapping slots for dynamic PUCCHs on different cells.

As illustrated, FIG. 1 includes a time-domain pattern (e.g., based on a series of DCIs indicating candidate target PUCCH cell slots, based on a semi-statically configured time-domain pattern, and so forth, as further described herein) comprising a first portion 102, second portion 104, third portion 106, and fourth portion 108, a Cell 0 (e.g., a reference cell) that includes a Slot 0 110, a Slot 1 112, a Slot 2 114, and a Slot 3 116, and a Cell 1 (e.g., a target PUCCH cell) that includes a Slot 0 118 and a Slot 1 120. As shown, the first portion 102 of the time-domain pattern indicates use of the Cell 0 (i.e., corresponding to Slot 0 110), the second portion 104 indicates use of the Cell 1 (i.e., corresponding to Slot 0 118, which overlaps with Slot 0 110), the third portion 106 indicates use of the Cell 1 (i.e., corresponding to Slot 1 120, which overlaps with Slot 3 116), and the fourth portion 108 indicates use of the Cell 0 (i.e., corresponding to Slot 3 116, which overlaps with Slot 1 120 of the PUCCH cell). Because multiple slots of the reference cell occur within a single slot of the PUCCH cell, the time-domain pattern may cause overlap of indicated cell slots to be used. In other words, a target PUCCH slot on one cell (e.g., Slot 0 110 of the reference cell/Cell 0) may overlap with a target PUCCH slot on another cell (e.g., Slot 0 118 of the PUCCH cell/Cell 1). Such scenarios may create additional complicated scenarios cases that would have to include resolving such overlapping (e.g., by multiplexing or dropping). To avoid such unnecessary complication, time-domain patterns (i.e., consecutive candidate target PUCCH cell slots indicated by DCI) may be restricted such that a target PUCCH slot on one cell does not overlap with a target PUCCH slot on another cell.

Figure 2:
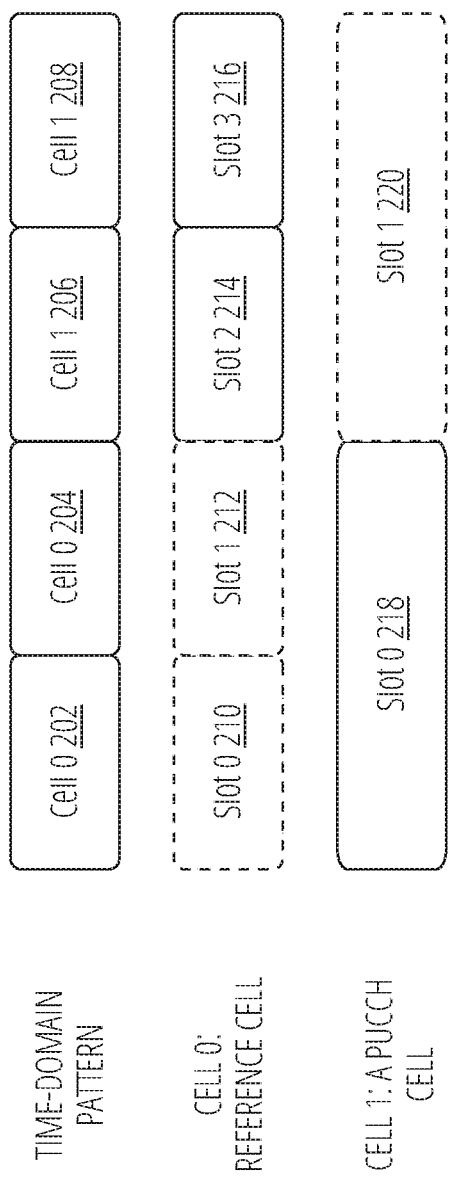
FIG. 2 illustrates a time-domain pattern in relation to reference cell slots and target PUCCH cell slots in accordance with one embodiment.

For instance, FIG. 2 illustrates an example of a time-domain pattern that would be allowed under such restrictions (i.e., in contrast to the scenario of FIG. 1, which may not be allowed under the foregoing restrictions). As shown, FIG. 2 includes a time-domain pattern (e.g., based on a series of dynamically indicated candidate target PUCCH cells via DCI) comprising a first portion 202, second portion 204, third portion 206, and fourth portion 208, a reference cell (i.e., Cell 0) that includes a Slot 0 210, a Slot 1 212, a Slot 2 214, and a Slot 3 216, and a PUCCH cell (i.e., Cell 1) that includes a Slot 0 218 and a Slot 1 220. As shown, the first portion 202 and the second portion 204 of the time-domain pattern indicate use of the reference cell (i.e., corresponding to the Slot 0 210 and the Slot 1 212 of the reference cell), and the third portion 206 and the fourth portion 208 of the time-domain pattern indicate use of the PUCCH cell (i.e., corresponding to the Slot 1 220 of the PUCCH cell). Accordingly, such time-domain pattern may be allowed as it does not cause any overlapping use of slots between the reference cell and the PUCCH cell.

Figure 3:
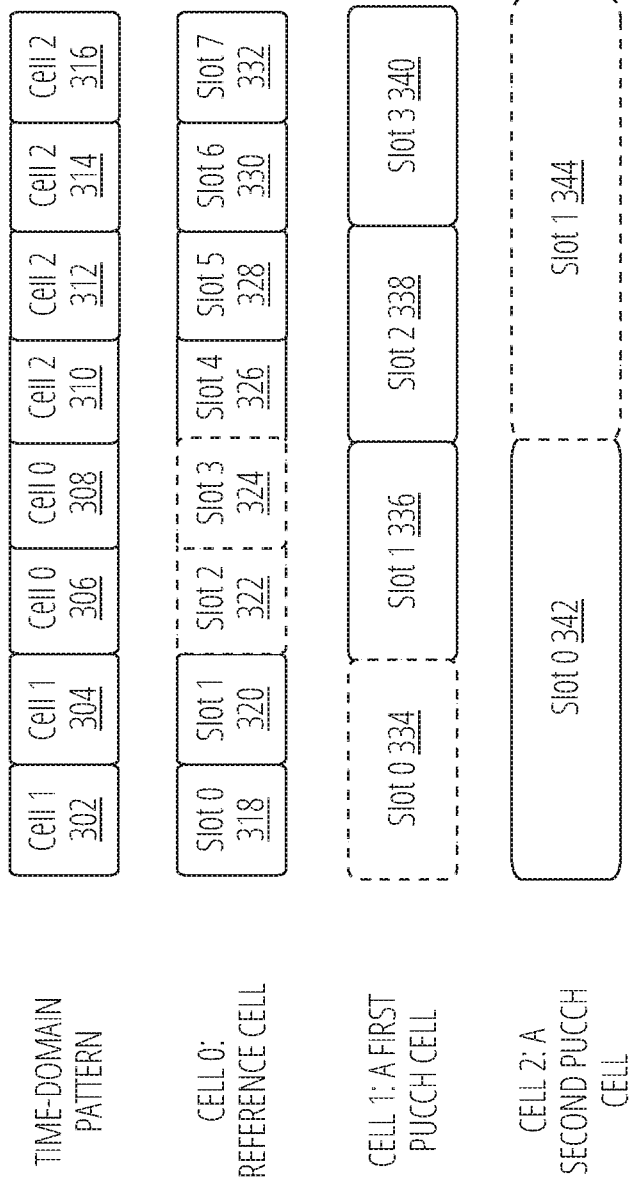
FIG. 3 illustrates a time-domain pattern in relation to reference cell slots and target PUCCH cell slots in accordance with one embodiment.

FIG. 3 illustrates another example of a time-domain pattern that would be allowed under such restrictions. As shown, FIG. 3 includes a time-domain pattern (e.g., based on a series of dynamically indicated candidate target PUCCH cells via DCI) comprising a first portion 302, second portion 306, third portion 308, fourth portion 310, a fifth portion 312, a sixth portion 314, and a seventh portion 316, a reference cell (i.e., Cell 0) that includes a Slot 0 318, a Slot 1 320, a Slot 2 322, a Slot 3 324, a Slot 4 326, a Slot 5 328, a Slot 6 330, and a Slot 7 332, a first PUCCH cell (i.e., Cell 1) that includes a Slot 0 334, a Slot 1 336, a Slot 2 338, and a Slot 3 340, and a PUCCH cell (i.e., Cell 2) that includes a Slot 0 342 and a Slot 1 344. As shown, the first portion 302 and the second portion 306 of the time-domain pattern indicate use of the first PUCCH cell (i.e., corresponding to the Slot 0 334 of the first PUCCH cell), the third portion 206 and the fourth portion 208 of the time-domain pattern indicate use of the reference cell (i.e., corresponding to the Slot 2 322 and the Slot 3 324 of the reference cell), and the fourth portion 310, the fifth portion 312, the sixth portion 314, and the seventh portion 316 of the time-domain pattern indicate use of the second PUCCH cell (i.e., corresponding to the Slot 1 344 of the second PUCCH cell). Accordingly, such time-domain pattern may be allowed as it does not cause any overlapping use of slots between the reference cell, the first PUCCH cell, and the second PUCCH cell.

Furthermore, the following RAN proposals related to PUCCH carrier switching may also apply to the solutions described further herein, including: 1. For semi-static PUCCH carrier switching, time-domain pattern configurations may be based on the following properties: a. A single time-domain pattern configuration per PUCCH cell group; b. A granularity of the time-domain pattern may be one slot of the reference cell. Determination of the reference cell may be performed in any applicable manner. The notation of a reference cell may or may not have to be introduced in the RAN1 specification depending on the manner in which reference cells are ultimately determined; c. A time-domain pattern may be applied periodically while such period and pattern length may be of any applicable manner (e.g., 10 ms length, RRC configuration); and d. A pattern may define, for each slot of the reference cell, at least an applicable PUCCH cell; 2. For semi-static PUCCH carrier switching, the PDSCH to HARQ-ACK offset k1 (as further described herein) may be interpreted based on the numerology and PUCCH configuration of a reference cell with respect to applying the time-domain PUCCH carrier switching pattern; and 3. For semi-static PUCCH carrier switching, the PUCCH resource indicator (PRI) may be interpreted based on a PUCCH configuration of a determined target PUCCH cell.

Currently, PUCCH resource SR configurations are defined for each logical channel within a cell group (i.e., CellGroupConfig→RLC-BearerConfig→LogicalChannelConfig→SchedulingRequestId, where SchedulingRequestId points to an SR configuration that has a corresponding PUCCH-ResourceId that points to a PUCCH resource defined in PUCCH-config). For instance, the following may apply:

```
SchedulingRequestConfig ::=            SEQUENCE {
    schedulingRequestToAddModList      SEQUENCE (SIZE (1..maxNRofSR-
ConfigPerCellGroup)) OF SchedulingRequestToAddMod
                                                           OPTIONAL, -- Need N
    schedulingRequestToReleaseList     SEQUENCE (SIZE (1..maxNRofSR-
ConfigPerCellGroup)) OF SchedulingRequestId
                                                           OPTIONAL, -- Need N
}
SchedulingRequestToAddMod ::=          SEQUENCE {
    schedulingRequestId                SchedulingRequestId,
    sr-ProhibitTimer                   ENUMERATED {ms1, ms2, ms8, ms16,
ms32, ms63, ms 128}    OPTIONAL,   -- Need S
    sr-TransMax                        ENUMERATED { n4, n8, n16, n32, n64,
spare3, spare2, spare1}
}
and
SchedulingRequestResourceConfig ::=    SEQUENCE {
    schedulingRequestResourceId            SchedulingRequestResourceId,
    schedulingRequestID                    SchedulingrequestId,
    periodicityAndOffset                   CHOICE {
        sym2                                   NULL,
        sym6or7                                NULL,
        sl1                                    NULL, -- Recurs in every slot
        sl2                                    INTEGER (0..1),
        sl4                                    INTEGER (0..3),
        sl5                                    INTEGER (0..4),
        sl8                                    INTEGER (0..7),
        sl10                                   INTEGER (0..9),
        sl16                                   INTEGER (0..15),
        sl20                                   INTEGER (0..19),
        sl40                                   INTEGER (0..39),
        sl80                                   INTEGER (0..79),
        sl160                                  INTEGER (0..159),
        sl320                                  INTEGER (0..319),
        sl640                                  INTEGER (0..639),
    }
    resource                               PUCCH-ResourceId
}
```

Currently, PUCCH resource configurations for CSI are defined for each serving cell, but a list of PUCCH resources that correspond to each UL BWP of the serving cell are provided (e.g., ServingCellConfig→CSI-MeasConfig→CSI-ReportConfig→CSI-ReportPeriodicityAndOffset and pucch-CSI-ResourceList, where CSI-ReportPeriodicityAndOffset is based on UL subcarrier spacing (SCS)). For instance, the following may apply:

Currently, with respect to PUCCH Resource Configurations for SPS HARQ-ACK: 1. With a single SPS configuration, a PUCCH resource is part of an SPS configuration; and 2. With multiple SPS configurations, a PUCCH resource is provided by sps-PUCCH-AN-List-r16 in a PUCCH-config. For example, the following may apply with respect to a single SPS configuration:

```
CSI-ReportConfig ::=            SEQUENCE {
    reportConfigId                  CSI-ReportConfigId,
    carrier                         ServCellIndex       OPTIONAL, -- Need S
    resourcesForChannelMeasurement  CSI-ResourceConfigId    OPTIONAL, -- Need S
    csi-IM-ResourcesForInterference CSI-ResourceConfigId    OPTIONAL, -- Need S
    nzp-CSI-RS-ResourcesForInterference CSI-ResourceConfigId OPTIONAL, -- Need S
    reportConfigType                CHOICE {
        periodic                        SEQUENCE {
            reportSlotConfig                CSI-ReportPeriodicityAndOffset,
            pucch-CSI-ResourceList          SEQUENCE (SIZE
(1..maxNrofBWPs)) OF PUCCH-CSI-Resource
        },
        semiPersistentOnPUCCH           SEQUENCE {
            reportSlotConfig                CSI-ReportPeriodicityAndOffset
            pucch-CSI-ResourceList          SEQUENCE (SIZE
(1..maxNrofBWPs)) OF PUCCH-CSI-Resource
        },
and
PUCCH-CSI-Resource ::=          SEQUENCE {
    uplinkBandwidthPartId           BWP-Id,
    pucch-Resource                  PUCCH-ResourceId
}
```

```
SPS-Config                    SEQUENCE {
    Periodicity               ENUMERATED {ms10, ms20, ms32, ms40, ms64, ms80,
ms128, ms160, ms320, ms640, spare6, spare5, spare4, spare3, spare2, spare1},
    NrofHARQ-Processes        INTEGER (1,8)
    n1PUCCH-AN                PUCCH-ResourceId           OPTIONAL, -- Need M
    mcs-Table                 ENUMERATED {qam64LowSE}    OPTIONAL, -- Need S
```

In contrast, for example, the following may apply with respect to multiple SPS configurations:

```
SPS-PUCCH-AN-List-r16 ::=        SEQUENCE (SIZE(1..4)) OF SPS-PUCCH-AN-r16
and
SPS-PUCCH-AN-r16 ::=             SEQUENCE {
    Sps-PUCCH-AN-ResourceId-r16        PUCCH-ResourceId,
    maxPayloadSize-r16                 INTEGER (4...256) OPTIONAL -Need R
}
```

Notably, R1-2108547, Final moderator summary on HARQ-ACK feedback enhancements for NR Rel-17 URLLC/IIoT, Moderator (Nokia), RAN1 #706-e may provide a reference for at least some of the above background information.

With respect to dynamic PUCCH carrier switching, the following assumptions may apply to the solutions described herein: 1. PUCCH configurations may be configured per UL BWP per PUCCH cell; 2. For dynamic HARQ-ACK, the PDSCH to HARQ-ACK offset K1 may be interpreted based on a numerology of a dynamically indicated target PUCCH cell. A PUCCH resource indication (PRI) may then be interpreted using a PUCCH configuration of the target PUCCH cell; and 3. UEs may not (or may not have to) expect overlapping PUCCH slots with dynamic PUCCH cell indications on more than one carrier.

The manner in which configured PUCCHs are handled in dynamic PUCCH carrier switching scenarios has yet to be determined. There have been discussions regarding whether to support PUCCH carrier switching for configured PUCCHs. However, it may be beneficial to support such scenarios to provide better support for configured PUCCHs because the alternative may have to utilize restrictions regarding dropping and/or configuration restrictions for configured PUCCHs.

Accordingly, the solutions provided herein relate to configuring dynamic PUCCH carrier switching, including: 1. How to handle the PUCCH resource determination for SR, CSI, and SPS HARQ-ACK; and 2. How to handle UCI multiplexing when PUCCHs overlap in time.

As further described above, solutions regarding PUCCH resource determination for SR, CSI and SPS HARQ-ACK will now be described. Initially, it should be noted that PUCCH resource determination for SR, CSI and SPS HARQ-ACK could potentially follow legacy behavior (i.e., deriving based on the configuration of the primary cell (PCell)/primary secondary cell group (SCG) cell (PSCell)).

Regardless, the following issues also have to be handled: 1. If the PUCCH is to be transmitted, given that PUCCH has to be transmitted on a target PUCCH cell based on a dynamic indication, a PUCCH resource to be used on the target PUCCH cell has to be determined; and 2. The UE may also have semi-statically-configured PUCCH on a PCell/PSCell and dynamic PUCCH on the target PUCCH cell. UCI multiplexing across different cells may also have to be defined.

Considering these issues, the general solution may include the following (which is described in further detail below): 1. The slot for the PUCCH for SR, CSI, and SPS HARQ-ACK is determined based on a numerology of the reference cell; 2. A target PUCCH cell is determined in accordance with the following: a. If the slot for the PUCCH for SR, CSI, or SPS HARQ-ACK overlaps with a PUCCH slot indicated by a DCI, the PUCCH cell indicated by the DCI may be the target PUCCH cell; b. If such overlap is not present: i. The PCell/PSCell may be the target PUCCH cell; or ii. The target PUCCH cell is determined based on a semi-statically configured time domain pattern. For instance, the network may provide the UE with a semi-statically configured time domain pattern that indicates a target PUCCH cell to be used for each given slot during a particular period of time. Notably, semi-static PUCCH switching (i.e., rather than dynamic PUCCH switching, as described herein) may utilize such a semi-statically configured time domain pattern: 3. The slot on the reference cell is mapped to a slot on the target PUCCH cell, with potential pruning of PUCCHs in case of mixed numerology; and 4. The PUCCH resource is determined based on the PUCCH configuration of the target PUCCH cell.

As briefly described above, the slot for the PUCCH for SR, CSI, and SPS HARQ-ACK is determined based on a numerology of a reference cell or a reference numerology. In a special case, the reference cell/numerology can be pre-defined as the PCell/PSCell, or can follow a pre-defined rule (e.g., a smallest sub-carrier spacing (SCS) among all PUCCH cells). Alternatively, the reference cell can be configured and/or the reference cell numerology can be configured. The benefit of such alternative is that it can provide more flexibility compared to a pre-defined reference cell, especially in mixed numerology scenarios.

With respect to SR, "periodicityAndOffset" may be interpreted based on the numerology of the reference cell. With respect to CSI, "CSI-ReportPeriodicityAndOffset" may also be interpreted based on the numerology of the reference cell. Finally, with respect to SPS HARQ-ACK, K1 may be indicated in an activation DCI and interpreted based on a numerology of the reference cell (i.e., same as dynamic HARQ-ACK). In an example, the following may apply:

```
CSI-ReportConfig ::=              SEQUENCE {
    reportConfigId                    CSI-ReportConfigId,
    carrier                           ServCellIndex                OPTIONAL, -- Need S
    resourcesForChannelMeasurement    CSI-ResourceConfigId
    csi-IM-ResourcesForInterference   CSI-ResourceConfigId         OPTIONAL, -- Need S
    nzp-CSI-RS-ResourcesForInterference  CSI-ResourceConfigId      OPTIONAL, -- Need S
    reportConfigType                  CHOICE {
        periodic                          SEQUENCE {
            reportSlotConfig                  CSI-ReportPeriodicityAndOffset,
            pucch-CSI-ResourceList            SEQUENCE (SIZE
(1..maxNrofBWPs)) OF PUCCH-CSI-Resource
        },
        semiPersistentOnPUCCH             SEQUENCE {
            reportSlotConfig                  CSI-ReportPeriodicityAndOffset
            pucch-CSI-ResourceList            SEQUENCE (SIZE
(1..maxNrofBWPs)) OF PUCCH-CSI-Resource
        },
and
SchedulingRequestResourceConfig ::=  SEQUENCE {
    schedulingRequestResourceId       SchedulingRequestResourceId,
    schedulingRequestID               SchedulingRequestId,
    periodicityAndOffset              CHOICE {
        sym2                              NULL,
        sym6or7                           NULL,
        sl1                               NULL,  -- Recurs in every slot
        sl2                               INTEGER (0..1),
        sl4                               INTEGER (0..3),
        sl5                               INTEGER (0..4),
        sl8                               INTEGER (0..7),
        sl10                              INTEGER (0..9),
        sl16                              INTEGER (0..15),
        sl20                              INTEGER (0..19),
        sl40                              INTEGER (0..39),
        sl80                              INTEGER (0..79),
        sl160                             INTEGER (0..159),
        sl320                             INTEGER (0..319),
        sl640                             INTEGER (0..639),
    }
    resource                          PUCCH-ResourceId
}
```

Again, as briefly described above, reference cell slots may be mapped to target PUCCH cell slots (with a potential pruning of PUCCHs in scenarios that include mixed numerology). In particular, three different scenarios may arise that each include a unique solution.

In a first scenario, the reference cell slots and the target PUCCH cell slots may include a same numerology, which results in a straightforward 1-to-1 mapping. Such scenarios avoid PUCCH pruning.

Figure 4:
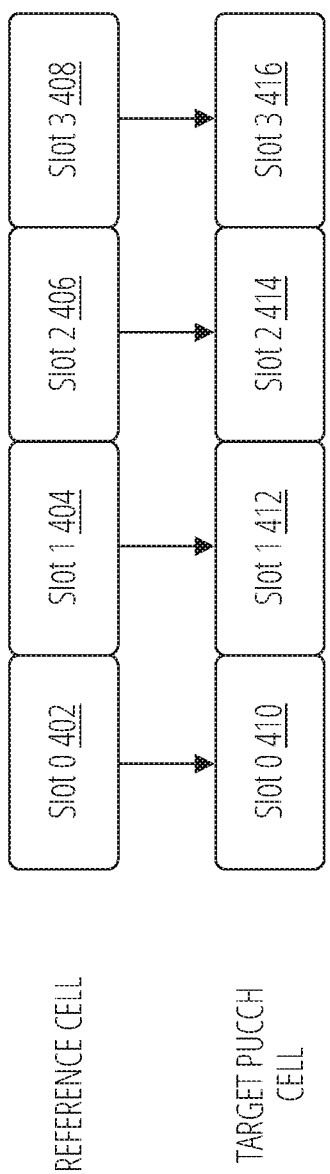
FIG. 4 illustrates a mapping of reference cell slots to target PUCCH cell slots in accordance with one embodiment.

FIG. 4 illustrates a mapping of reference cell slots to target PUCCH cell slots when the two cells have the same numerology. As shown, FIG. 4 includes a reference cell having Slot 0 402, Slot 1 404, Slot 2 406, and Slot 3 408 and a target PUCCH cell having a Slot 0 410, a Slot 1 412, a Slot 2 414, and a Slot 3 416. Each of these slots of the reference cell (e.g., Slot 0 402, Slot 1 404, and so forth) may be mapped 1-to-1 to the corresponding slots of the target PUCCH cell (e.g., Slot 0 410, Slot 1 412, and so forth) because these two cells have slots with the same numerology.

In a second scenario, the SCS of the reference cell is smaller than the SCS of the target PUCCH cell. In such scenarios, because one slot on the reference cell overlaps with multiple slots on the target PUCCH cell, one or more rules have to be defined to map reference cell slots to one of the multiple target PUCCH slots. For instance, in some embodiments, reference cell slots may be mapped to a first overlapping slot of the target PUCCH cell. In other embodiments, reference cell slots may be mapped to a last overlapping slot of the target PUCCH cell. In yet other embodiments, mapping of reference cell slots to overlapping target PUCCH cell slots may be based on a provided configuration. Regardless of the particular mapping, PUCCH pruning may again be avoided in such scenarios.

Figure 5:
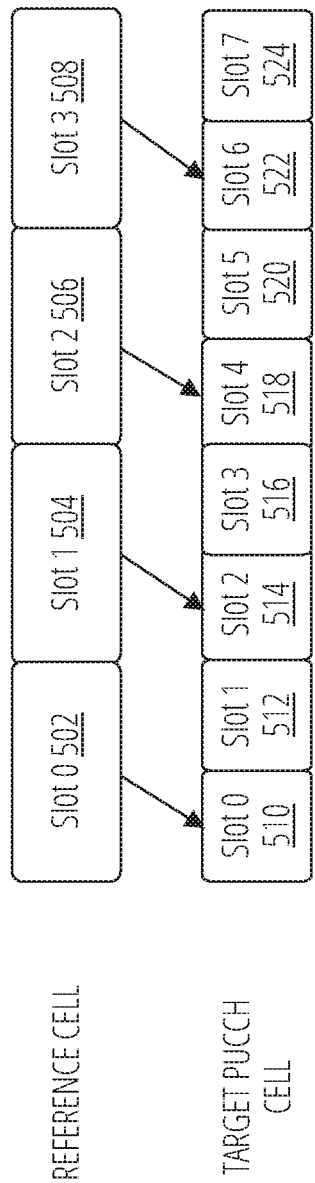
FIG. 5 illustrates a mapping of reference cell slots to target PUCCH cell slots in accordance with one embodiment.

FIG. 5 illustrates a mapping of reference cell slots to target PUCCH cell slots when the SCS of the reference cell is smaller than the SCS of the target PUCCH cell. As shown, FIG. 5 includes a reference cell having Slot 0 502, Slot 1 504, Slot 2 506, and Slot 3 508 and a target PUCCH cell having a Slot 0 510, a Slot 1 512, a Slot 2 514, a Slot 3 516, a Slot 4 518, a Slot 5 520, a Slot 6 522, and a Slot 7 524. Each of these slots of the reference cell (e.g., Slot 0 502, Slot 1 504, and so forth) may be mapped to a single overlapping corresponding slot of the target PUCCH cell (e.g., Slot 0 510, Slot 1 512, and so forth), as further described above. While numerous options may be available for such mapping, FIG. 5 illustrates each reference cell slot being mapped to a first corresponding overlapping slot of the target PUCCH cell (e.g., Slot 0 502 of the reference cell to Slot 0 510 of the target PUCCH cell, Slot 1 504 of the reference cell to Slot 2 514 of the target PUCCH cell, and so forth).

In a third scenario, the SCS of the reference cell is greater than the SCS of the target PUCCH cell. Accordingly, multiple slots of the reference cell overlap (or map to) a single slot of the target PUCCH cell. As such, some PUCCHs may be pruned in this third scenario.

Based on the complexity of the third scenario, multiple options may be utilized, including the following: 1. The UE does not expect PUCCHs in multiple slots of the reference cell that map to the same slot of the target PUCCH cell; 2. Only PUCCHs in one of the overlapping slots of the reference cell are mapped to the corresponding slot of the target PUCCH cell, while the PUCCHs in other slots are dropped. For instance, the mapped slot can be the first overlapping slot, can be the last overlapping slot, or can follow a configuration. Utilizing this option may allow simple multiplexing behavior (i.e., reusing 3GPP Release 15 (Rel-15) behavior); 3. As an enhancement of option 2, pruning may be applied to SR and CSI, but not SPS HARQ-ACK. In other words, SPS HARQ-ACK can still be mapped from multiple slots of the reference cell to a single slot of the target PUCCH cell in such embodiments: 4. If the same SR/CSI configuration has PUCCHs in multiple overlapping slots on the reference cell, only one of such slots is kept and mapped to the target PUCCH cell. Pruning like this has to happen if such slots are mapped to the same PUCCH resource on the target PUCCH cell, as further described below. Notably, a UE does not have to transmit multiple SRs or multiple CSI reports for the same configuration. In addition, for SR, if at least one of the SR occasions is positive, the SR can be positive on the target PUCCH cell.

Figure 6:
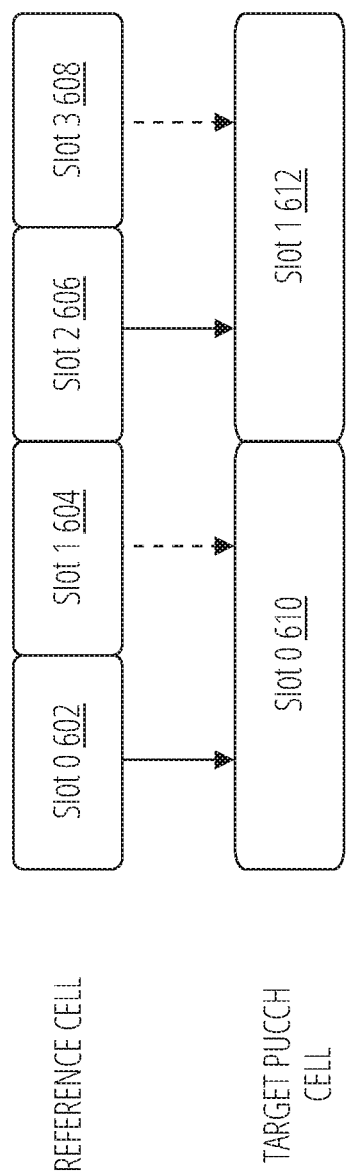
FIG. 6 illustrates a mapping of reference cell slots to target PUCCH cell slots in accordance with one embodiment.

FIG. 6 illustrates a mapping of reference cell slots to target PUCCH cell slots when the SCS of the reference cell is greater than the SCS of the target PUCCH cell. As shown, FIG. 6 includes a reference cell having Slot 0 602, Slot 1 604, Slot 2 606, and Slot 3 608 and a target PUCCH cell having a Slot 0 610 and Slot 1 612. Only one of the overlapping slots of the reference cell (i.e., Slot 0 602 and Slot 1 604 with respect to Slot 0 610, and Slot 2 606 and Slot 3 608 with respect to Slot 1 612)) may be mapped to a single overlapping corresponding slot of the target PUCCH cell (e.g., Slot 0 610 and Slot 1 612), as further described above. While numerous options may be available for such mapping, FIG. 6 illustrates the first overlapping reference cell slot being mapped to a corresponding slot of the target PUCCH cell (e.g., Slot 0 602 of the reference cell to Slot 0 610 of the target PUCCH cell and Slot 2 606 of the reference cell to Slot 1 612 of the target PUCCH cell).

A PUCCH resource may then be determined based on a PUCCH configuration of the target PUCCH cell. For instance, in a first option, the existing parameter for PUCCH resource ID may be interpreted based on a PUCCH configuration of the target PUCCH cell. One drawback to this approach is that for the same configuration, the target PUCCH cell may be different for different occasions. Having only a single PUCCH resource ID may limit the configuration flexibility at the base station (e.g., gNB) for the PUCCH resources configured for the multiple cells.

In a second option, the UE may be configured with a list of PUCCH resource IDs that each correspond to one of a number of candidate PUCCH cells. Accordingly, for each target PUCCH cell, the corresponding PUCCH resource ID may be used. For instance, with respect to SR, instead of PUCCH-ResourceID, "SEQUENCE (SIZE(1..maxNrOfPucchCells)) OF PUCCH-ResourceID" or similar may be used. Furthermore, assuming there are two PUCCH cells and the SR is configured with two PUCCH resource IDs (e.g., (5, 8)), the UE may use PUCCH resource #5 according to a PUCCH-config for the first PUCCH cell when the target PUCCH cell is the first PUCCH cell) or PUCCH resource #8 according to a PUCCH-config for the second PUCCH cell when the target PUCCH cell is the second PUCCH cell.

CSI may be handled similarly. In particular, for CSI, "pucch-CSI-ResourceList" may be included in the CSI configuration and include a sequence of resource configurations where each such resource corresponds to one of the PUCCH cells.

For SPS HARQ-ACK, the existing "n1PUCCH-AN," "sps-PUCCH-AN-List-r16," or "sps-PUCCH-AN-ResourceID-r16" can be extended to include a list of such configurations for multiple PUCCH cells.

Finally, after the above procedures/solutions have occurred, UCI multiplexing may be applicable. In particular, once all the PUCCH resources (i.e., HARQ-ACK, SR, CSI) are determined for a given slot on the target PUCCH cell (in accordance with the procedures/solutions described above including determining slots for PUCCH regarding SR. CSI, and SPS HARQ-ACK and mapping reference cell slots to target PUCCH cell slots), such PUCCHs may overlap in time or may overlap with PUSCH(s) in time. In such cases, UCI multiplexing on PUCCH/PUSCH may be applicable.

In particular, for the first and second scenarios related to slot mapping discussed above, Rel-15 UCI multiplexing procedure can be directly reused because the maximum number of PUCCHs for each UCI type may be exactly the same as in Rel-15.

For the third scenario related to slot mapping discussed above, however, various procedures/solutions may be utilized. For instance, with respect to handling dynamic HARQ-ACKs, the PDSCH to HARQ-ACK offset, K1, may be interpreted based on a numerology of the dynamically indicated target PUCCH cell. Following the existing principle, there is to be, at most, one PUCCH for dynamic HARQ-ACK in one slot on the target PUCCH cell.

For the third scenario, when handling SPS HARQ-ACK in cases having multiple PUCCHs for SPS HARQ-ACK mapped to the same slot on target PUCCH cell (i.e., options 3 and 4 of the third scenario described above with respect to slot mapping): 1. The SPS HARQ-ACK payload can be concatenated in a pre-defined order (e.g., based on a configuration) and the PUCCH resource may be determined based on the SPS PUCCH configuration of the target PUCCH cell; or 2. When there is also a dynamic HARQ-ACK, the dynamic HARQ-ACK payload and the SPS HARQ-ACK payload can be concatenated in a pre-defined order.

Once the handling of HARQ-ACK is complete, Rel-15 multiplexing procedures can be reused to multiplex UCI on PUCCH/PUSCH. In addition, Rel-15 multiplexing handling may also be used for SR and CSI.

Notably, when a sub-slot-based HARQ-ACK feedback is configured for a PUCCH cell, "slot," as used herein, can be replaced by "sub-slot" for such cells in the proposed solutions. In addition, if there are two physical layer (PHY) priorities, the described procedures can be followed for each priority. In such cases, however, a single time-domain pattern may apply to both PHY priorities. Furthermore, while examples provided herein are generally described with respect to cases having PUCCH switching between two cells, the solutions described herein equally apply to cases having more than two cells.

Figure 7:
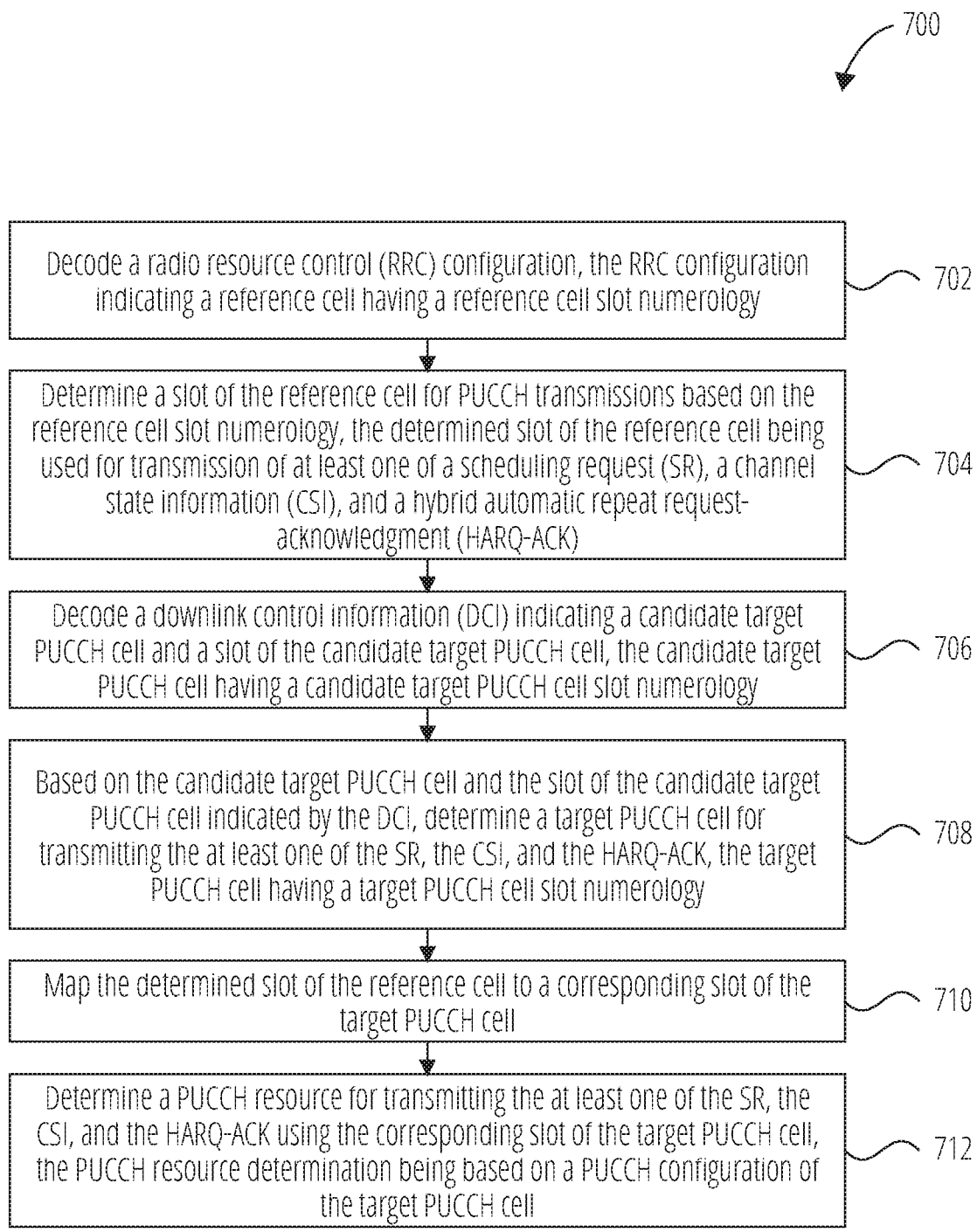
FIG. 7 illustrates a flowchart of a method for uplink control channel carrier switching in accordance with one embodiment.

FIG. 7 illustrates a flowchart of a method 700 for PUCCH carrier switching at a UE. In block 702, the method 700 decodes a radio resource control (RRC) configuration. The RRC configuration may indicate a reference cell having a reference cell slot numerology. For instance, the reference cell may have a numerology as further illustrated by Cell 0 (i.e., Slot 0) 110, Slot 1 112, and so forth) and Cell 1 (i.e., Slot 0 118 and Slot 1 120) of FIG. 1. In block 704, the method 700 determines a slot of the reference cell for PUCCH transmissions based on the reference cell slot numerology. The determined slot of the reference cell may be used for transmission of at least one of a scheduling request (SR), a channel state information (CSI), and a hybrid automatic repeat request-acknowledgment (HARQ-ACK).

In block 706, the method 700 decodes a downlink control information (DCI) indicating a candidate target PUCCH cell and a slot of the candidate target PUCCH cell. The candidate target PUCCH cell may have a candidate target PUCCH cell slot numerology. For instance. Cell 0 and Cell 1 of FIG. 1 each illustrate a different slot numerology. In block 708, the method 700, based on the candidate target PUCCH cell and the slot of the candidate target PUCCH cell indicated by the DCI, determines a target PUCCH cell for transmitting the at least one of the SR, the CSI, and the HARQ-ACK, the target PUCCH cell having a target PUCCH cell slot numerology. For instance, such determination may be based on whether indicated candidate target PUCCH cell slot overlaps with a slot of the SR, the CSI, or the HARQ-ACK.

In block 710, the method 700 maps the determined slot of the reference cell to a corresponding slot of the target PUCCH cell. For instance, FIG. 4, FIG. 5, and FIG. 6 each illustrate slot mapping from a reference cell to the target PUCCH cell. In block 712, the method 700 determines a PUCCH resource for transmitting the at least one of the SR, the CSI, and the HARQ-ACK using the corresponding slot of the target PUCCH cell. The PUCCH resource determination may be based on a PUCCH configuration of the target PUCCH cell.

The method 700 may also include to determine the target PUCCH cell further including to determine that the slot of the candidate target PUCCH cell indicated by the DCI overlaps with the determined slot of the reference cell, and to determine that the candidate target PUCCH cell is the target PUCCH cell. The method 700 may also include to determine the target PUCCH cell further including to determine that the slot of the candidate target PUCCH cell indicated by the DCI does not overlap with the determined slot of the reference cell, and to determine that a primary cell (PCell) or a primary secondary cell group (SCG) cell (PSCell) is the target PUCCH cell.

The method 700 may also include to map further including to identify that the reference cell slot numerology and the target PUCCH cell slot numerology comprises a same numerology, and to generate a 1-to-1 mapping between slots of the reference cell and slots of the target PUCCH cell.

The method 700 may also include to map further including to identify that a reference cell subcarrier spacing (SCS) associated with the reference cell is less than a target PUCCH SCS associated with the target PUCCH cell, and to generate a mapping between slots of the reference cell and slots of the target PUCCH cell. The mapping may include each given reference cell slot being mapped to a single target PUCCH cell slot that overlaps with the given reference cell slot.

The method 700 may also include to map further including to identify that a reference cell subcarrier spacing (SCS) associated with the reference cell is greater than a target PUCCH SCS associated with the target PUCCH cell, and to generate a mapping between slots of the reference cell and slots of the target PUCCH cell. The mapping may include a single reference cell slot that overlaps with a given target PUCCH cell slot being mapped to the given target PUCCH cell slot, wherein other reference cell slots that overlap with the given target PUCCH cell slot are dropped.

The method 700 may also include to map further including to identify that a reference cell subcarrier spacing (SCS) associated with the reference cell is greater than a target PUCCH SCS associated with the target PUCCH cell, and generate a first mapping between slots of the reference cell and slots of the target PUCCH cell. The first mapping may include a single reference cell slot that overlaps with a first target PUCCH cell slot being mapped to the first target PUCCH cell slot, wherein other reference cell slots that overlap with the first target PUCCH cell slot are dropped. The first mapping may be applied to SR transmissions and CSI transmissions. To map may further include to generate a second mapping between the slots of the reference cell and the slots of the target PUCCH cell. The second mapping may include each reference cell slot that overlaps with a second target PUCCH cell slot being mapped to the second target PUCCH cell slot. The second mapping being applied to SPS HARQ-ACK transmissions. Notably, the first and second target PUCCH cell slots may comprise a same slot or different slots.

The method 700 may further include to identify that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell. The method 700 may further include to determine that an SR configuration or a CSI configuration includes multiple PUCCH transmissions scheduled to occur in the multiple slots of the reference cell, and based on determining, drop an SR transmission associated with the SR configuration or drop a CSI transmission associated with the CSI configuration.

The method 700 may also include to determine the PUCCH resource further including to decode a resource configuration including a plurality of PUCCH resource identifications (IDs), wherein each of the plurality of PUCCH resource IDs corresponds to one of a plurality of candidate target PUCCH cells.

The method 700 may also include determining the PUCCH resource further including interpreting an existing parameter associated with a PUCCH resource identification (ID) based on a PUCCH configuration of the target PUCCH cell. The method 700 may also include determining the PUCCH resource further including decoding a resource configuration including a list of PUCCH resource identifications (IDs), wherein each PUCCH resource ID corresponds to one of a plurality of candidate PUCCH cells included within the RRC configuration.

The method 700 may further include identifying that the HARQ-ACK comprises a dynamic HARQ-ACK, and interpreting a physical downlink shared channel (PDSCH) to HARQ-ACK offset, K1, based on the candidate target PUCCH cell numerology of the candidate target PUCCH cell indicated by the DCI.

The method 700 may further include identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell. The method 700 may further include identifying that one or more dynamic HARQ-ACK transmissions and one or more semi-persistent scheduling (SPS) HARQ-ACK transmissions are scheduled to occur in the multiple slots of the reference cell. The method 700 may further include concatenating a dynamic HARQ-ACK payload of the one or more dynamic HARQ-ACK transmissions and an SPS HARQ-ACK payload of the one or more SPS HARQ-ACK transmissions in the multiple slots of the reference cell in a pre-defined order. Concatenating may include multiplexing the dynamic HARQ-ACK payload of the one or more dynamic HARQ-ACK transmissions and the SPS HARQ-ACK payload of the one or more SPS HARQ- ACK transmissions. The method 700 may further include encoding a single PUCCH HARQ-ACK transmission using the multiplexed payload of the one or more dynamic HARQ-ACK transmissions and the one or more SPS HARQ-ACK transmissions.

The method 700 may further include identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell. The method 700 may further include identifying that multiple semi-persistent scheduling (SPS) HARQ-ACK transmissions are scheduled to occur in the multiple slots of the reference cell and concatenating a payload of each of the multiple SPS HARQ-ACK transmissions in the multiple slots of the reference cell in a predefined order. Concatenating may include multiplexing the payload of each of the multiple SPS HARQ-ACK transmissions. The method 700 may further include encoding a single PUCCH HARQ-ACK transmission using the multiplexed payload of each of the multiple SPS HARQ-ACK transmissions.

The method 700 may also include to determine the slot of the reference cell for PUCCH transmissions based on the reference cell slot numerology further including to interpret one or more existing parameters for time domain resource allocation based on the reference cell slot numerology. The method 700 may also include to determine the target PUCCH cell further including to decode a time-domain pattern communication associated with a duration of time. The time domain pattern may indicate a target PUCCH cell for one or more PUCCH transmissions at each point in time within the duration of time.

Embodiments contemplated herein include an apparatus comprising means to perform one or more elements of the method 700. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 700. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a UE (such as a wireless device 902 that is a UE, as described herein).

Embodiments contemplated herein include a signal as described in or related to one or more elements of the method 700.

Embodiments contemplated herein include a computer program or computer program product comprising instructions, wherein execution of the program by a processor is to cause the processor to carry out one or more elements of the method 700. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Figure 8:
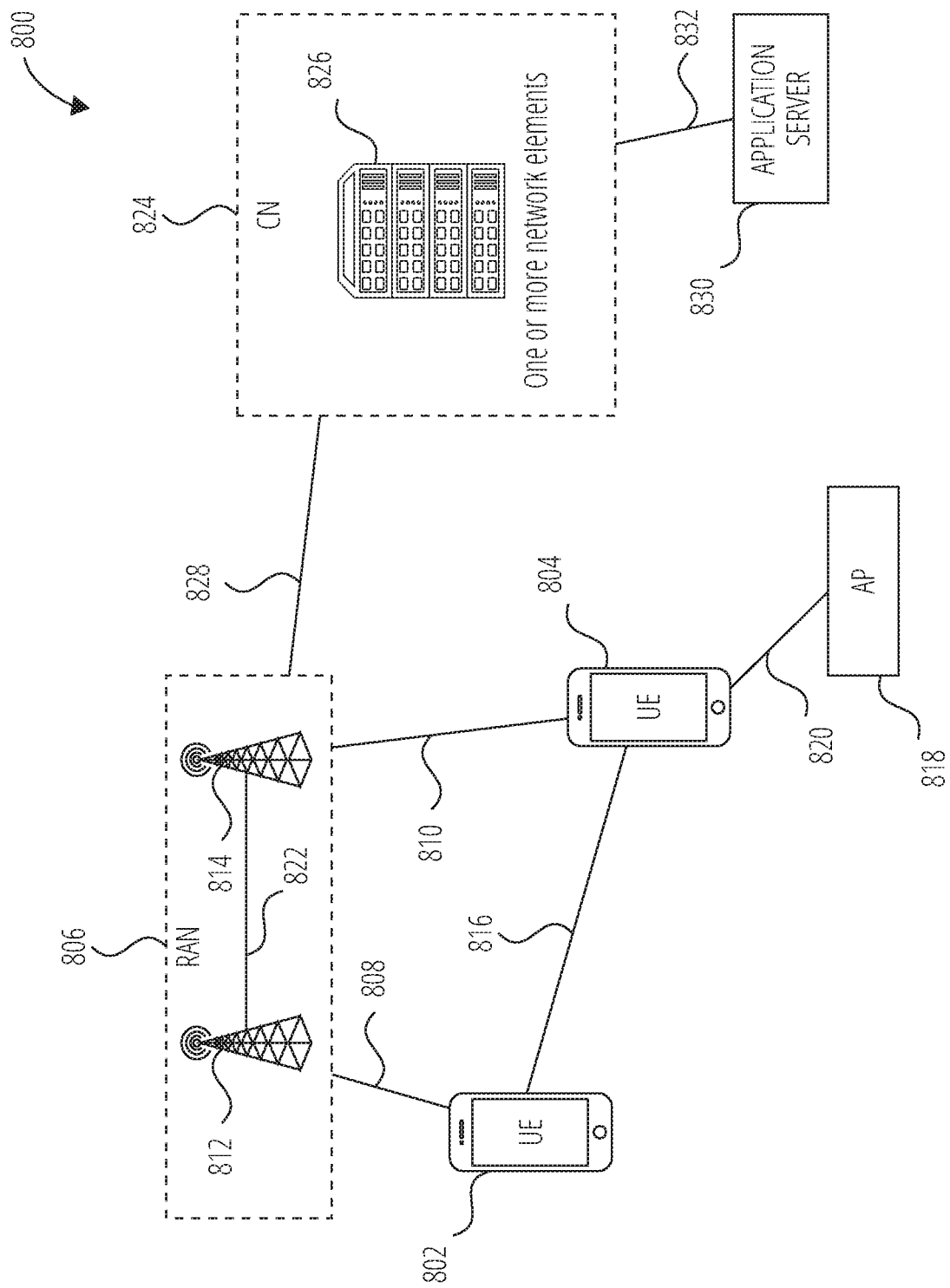
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touchscreen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations, such as base station 812 and base station 814, that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 902.11 protocol, wherein the AP 818 may comprise a Wi-Fi™ router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
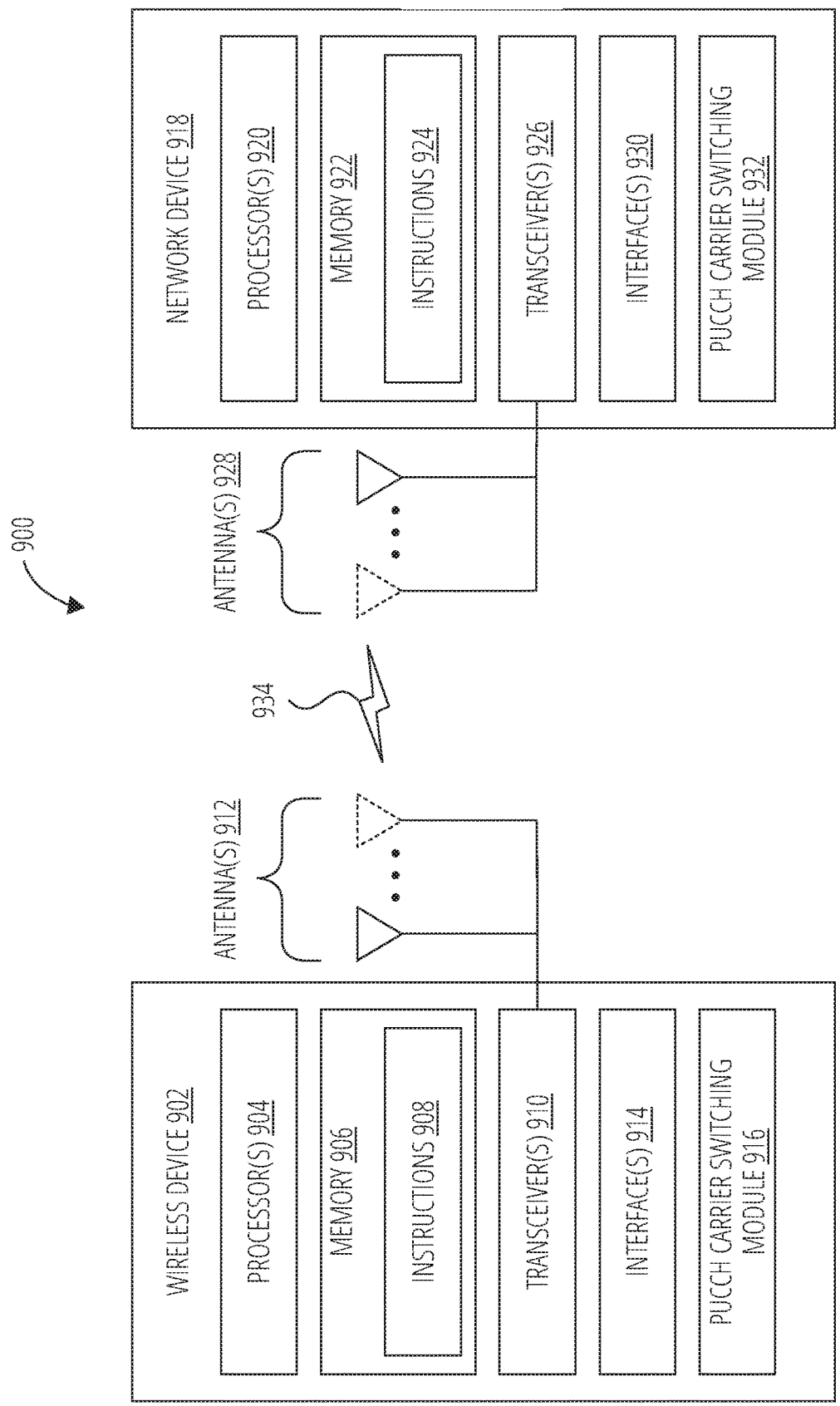
FIG. 9 illustrates a system for performing signaling between a wireless device and a network device, according to embodiments disclosed herein.

FIG. 9 illustrates a system 900 for performing signaling 934 between a wireless device 902 and a network device 918, according to embodiments disclosed herein. The system 900 may be a portion of a wireless communications system as herein described. The wireless device 902 may be, for example, a UE of a wireless communication system. The network device 918 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 934) to and/or from the wireless device 902 with other devices (e.g., the network device 918) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a PUCCH carrier switching module 916. The PUCCH carrier switching module 916 may be implemented via hardware, software, or combinations thereof. For example, the PUCCH carrier switching module 916 may be implemented as a processor, circuit, and/or instructions 908 stored in the memory 906 and executed by the processor(s) 904. In some examples, the PUCCH carrier switching module 916 may be integrated within the processor(s) 904 and/or the transceiver(s) 910. For example, the PUCCH carrier switching module 916 may be implemented by a combination of software components (e.g., executed by a DSP or a general processor) and hardware components (e.g., logic gates and circuitry) within the processor(s) 904 or the transceiver(s) 910.

The PUCCH carrier switching module 916 may be used for various aspects of the present disclosure, for example, aspects of FIGS. 1 through 7. The PUCCH carrier switching module 916 is configured to determine reference cell numerology, determine target PUCCH cells, map reference cell slots to target PUCCH cell slots, determine PUCCH resources, perform UCI multiplexing, and so forth.

The network device 918 may include one or more processor(s) 920. The processor(s) 920 may execute instructions such that various operations of the network device 918 are performed, as described herein. The processor(s) 904 may include one or more baseband processors implemented using, for example, a CPU, a DSP, an ASIC, a controller, an FPGA device, another hardware device, a firmware device, or any combination thereof configured to perform the operations described herein.

The network device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The network device 918 may include one or more transceiver(s) 926 that may include RF transmitter and/or receiver circuitry that use the antenna(s) 928 of the network device 918 to facilitate signaling (e.g., the signaling 934) to and/or from the network device 918 with other devices (e.g., the wireless device 902) according to corresponding RATs.

The network device 918 may include one or more antenna(s) 928 (e.g., one, two, four, or more). In embodiments having multiple antenna(s) 928, the network device 918 may perform MIMO, digital beamforming, analog beamforming, beam steering, etc., as has been described.

The network device 918 may include one or more interface(s) 930. The interface(s) 930 may be used to provide input to or output from the network device 918. For example, a network device 918 that is a base station may include interface(s) 930 made up of transmitters, receivers, and other circuitry (e.g., other than the transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

The network device 918 may include a PUCCH carrier switching module 932. The PUCCH carrier switching module 932 may be implemented via hardware, software, or combinations thereof. For example, the PUCCH carrier switching module 932 may be implemented as a processor, circuit, and/or instructions 924 stored in the memory 922 and executed by the processor(s) 920. In some examples, the PUCCH carrier switching module 932 may be integrated within the processor(s) 920 and/or the transceiver(s) 926. For example, the PUCCH carrier switching module 932 may be implemented by a combination of software components (e.g., executed by a DSP or a general processor) and hardware components (e.g., logic gates and circuitry) within the processor(s) 920 or the transceiver(s) 926.

The PUCCH carrier switching module 932 may be used for various aspects of the present disclosure, for example, aspects of FIGS. 1 through 7. The PUCCH carrier switching module 932 is configured to assist UEs in performing PUCCH carrier switching.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE) comprising:
a processor; and
a memory storing instructions that, when executed by the processor, configure the UE to:
  decode a radio resource control (RRC) configuration, the RRC configuration indicating a reference cell having a reference cell slot numerology;
  determine a slot of the reference cell for PUCCH transmissions based on the reference cell slot numerology, the determined slot of the reference cell being used for transmission of at least one of a scheduling request (SR), a channel state information (CSI), and a hybrid automatic repeat request-acknowledgment (HARQ-ACK);
  decode a downlink control information (DCI) indicating a candidate target PUCCH cell and a slot of the candidate target PUCCH cell, the candidate target PUCCH cell having a candidate target PUCCH cell slot numerology;
  based on the candidate target PUCCH cell and the slot of the candidate target PUCCH cell indicated by the DCI, determine a target PUCCH cell for transmitting the at least one of the SR, the CSI, and the HARQ-ACK, the target PUCCH cell having a target PUCCH cell slot numerology by:
    determining that the slot of the candidate target PUCCH cell indicated by the DCI does not overlap with the determined slot of the reference cell; and
    determining that a primary cell (PCell) or a primary secondary cell group (SCG) cell (PSCell) is the target PUCCH cell;
  map the determined slot of the reference cell to a corresponding slot of the target PUCCH cell; and
  determine a PUCCH resource for transmitting the at least one of the SR, the CSI, and the HARQ-ACK using the corresponding slot of the target PUCCH cell, the PUCCH resource determination being based on a PUCCH configuration of the target PUCCH cell.

2. The UE of claim 1, wherein to map further includes to:
identify that the reference cell slot numerology and the target PUCCH cell slot numerology comprise a same numerology; and
generate a 1-to-1 mapping between slots of the reference cell and slots of the target PUCCH cell.

3. The UE of claim 1, wherein to map further includes to:
identify that a reference cell subcarrier spacing (SCS) associated with the reference cell is less than a target PUCCH SCS associated with the target PUCCH cell; and
generate a mapping between slots of the reference cell and slots of the target PUCCH cell, the mapping including each given reference cell slot being mapped to a single target PUCCH cell slot that overlaps with the given reference cell slot.

4. The UE of claim 1, wherein to map further includes to:
identify that a reference cell subcarrier spacing (SCS) associated with the reference cell is greater than a target PUCCH SCS associated with the target PUCCH cell; and
generate a mapping between slots of the reference cell and slots of the target PUCCH cell, the mapping including a single reference cell slot that overlaps with a given target PUCCH cell slot being mapped to the given target PUCCH cell slot, wherein other reference cell slots that overlap with the given target PUCCH cell slot are dropped.

5. The UE of claim 1, wherein to map further includes to:
identify that a reference cell subcarrier spacing (SCS) associated with the reference cell is greater than a target PUCCH SCS associated with the target PUCCH cell;
generate a first mapping between slots of the reference cell and slots of the target PUCCH cell, the first mapping including a single reference cell slot that overlaps with a first target PUCCH cell slot being mapped to the first target PUCCH cell slot, wherein other reference cell slots that overlap with the first target PUCCH cell slot are dropped, the first mapping being applied to SR transmissions and CSI transmissions; and
generate a second mapping between the slots of the reference cell and the slots of the target PUCCH cell, the second mapping including each reference cell slot that overlaps with a second target PUCCH cell slot being mapped to the second target PUCCH cell slot, the second mapping being applied to SPS HARQ-ACK transmissions.

6. The UE of claim 1, the memory further storing instructions that, when executed by the processor, configure the UE to:
identify that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell;
determine that an SR configuration or a CSI configuration includes multiple PUCCH transmissions scheduled to occur in the multiple slots of the reference cell; and
based on determining, drop an SR transmission associated with the SR configuration or drop a CSI transmission associated with the CSI configuration.

7. The UE of claim 1, wherein to determine the PUCCH resource further includes to decode a resource configuration including a plurality of PUCCH resource identifications (IDs), wherein each of the plurality of PUCCH resource IDs corresponds to one of a plurality of candidate target PUCCH cells.

8. A method for physical uplink control channel (PUCCH) carrier switching at a user equipment (UE), the method comprising:
decoding a radio resource control (RRC) configuration, the RRC configuration indicating a reference cell having a reference cell slot numerology;
determining a slot of the reference cell for PUCCH transmissions based on the reference cell slot numerology, the determined slot of the reference cell being used for transmission of at least one of a scheduling request (SR), a channel state information (CSI), and a hybrid automatic repeat request-acknowledgment (HARQ-ACK);
decoding a downlink control information (DCI) indicating a candidate target PUCCH cell and a slot of the candidate target PUCCH cell, the candidate target PUCCH cell having a candidate target PUCCH cell slot numerology;
based on the candidate target PUCCH cell and the slot of the candidate target PUCCH cell indicated by the DCI, determining a target PUCCH cell for transmitting the at least one of the SR, the CSI, and the HARQ-ACK, the target PUCCH cell having a target PUCCH cell slot numerology by:
   determining that the slot of the candidate target PUCCH cell indicated by the DCI does not overlap with the determined slot of the reference cell; and
   determining that a primary cell (PCell) or a primary secondary cell group (SCG) cell (PSCell) is the target PUCCH cell;
mapping the determined slot of the reference cell to a corresponding slot of the target PUCCH cell; and
determining a PUCCH resource for transmitting the at least one of the SR, the CSI, and the HARQ-ACK using the corresponding slot of the target PUCCH cell, the PUCCH resource determination being based on a PUCCH configuration of the target PUCCH cell.

9. The method of claim 8, wherein determining the PUCCH resource further includes interpreting an existing parameter associated with a PUCCH resource identification (ID) based on the PUCCH configuration of the target PUCCH cell.

10. The method of claim 8, wherein determining the PUCCH resource further includes decoding a resource configuration including a list of PUCCH resource identifications (IDs), wherein each PUCCH resource ID corresponds to one of a plurality of candidate PUCCH cells included within the RRC configuration.

11. The method of claim 8, further comprising:
identifying that the HARQ-ACK comprises a dynamic HARQ-ACK; and
interpreting a physical downlink shared channel (PDSCH) to HARQ-ACK offset, K1, based on the candidate target PUCCH cell numerology of the candidate target PUCCH cell indicated by the DCI.

12. The method of claim 8, wherein further comprising:
identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell;
identifying that one or more dynamic HARQ-ACK transmissions and one or more semi-persistent scheduling (SPS) HARQ-ACK transmissions are scheduled to occur in the multiple slots of the reference cell;
concatenating a dynamic HARQ-ACK payload of the one or more dynamic HARQ-ACK transmissions and an SPS HARQ-ACK payload of the one or more SPS HARQ-ACK transmissions in the multiple slots of the reference cell in a pre-defined order, concatenating including multiplexing the dynamic HARQ-ACK payload of the one or more dynamic HARQ-ACK transmissions and the SPS HARQ-ACK payload of the one or more SPS HARQ-ACK transmissions; and
encoding a single PUCCH HARQ-ACK transmission using the multiplexed payload of the one or more dynamic HARQ-ACK transmissions and the one or more SPS HARQ-ACK transmissions.

13. The method of claim 8, further comprising:
identifying that a reference cell subcarrier spacing (SCS) associated with the reference cell is greater than a target PUCCH SCS associated with the target PUCCH cell, wherein the determined slot of the reference cell comprises multiple slots of the reference cell that overlap with the corresponding slot of the target PUCCH cell;
identifying that multiple semi-persistent scheduling (SPS) HARQ-ACK transmissions are scheduled to occur in the multiple slots of the reference cell;
concatenating a payload of each of the multiple SPS HARQ-ACK transmissions in the multiple slots of the reference cell in a pre-defined order, concatenating including multiplexing the payload of each of the multiple SPS HARQ-ACK transmissions; and
encoding a single PUCCH HARQ-ACK transmission using the multiplexed payload of each of the multiple SPS HARQ-ACK transmissions.

14. A non-transitory computer-readable storage medium, the computer-readable storage medium including instructions that when executed by a processor of a user equipment (UE), cause the UE to:
decode a radio resource control (RRC) configuration, the RRC configuration indicating a reference cell having a reference cell slot numerology;
determine a slot of the reference cell for PUCCH transmissions based on the reference cell slot numerology, the determined slot of the reference cell being used for transmission of at least one of a scheduling request (SR), a channel state information (CSI), and a hybrid automatic repeat request-acknowledgment (HARQ-ACK);
decode a downlink control information (DCI) indicating a candidate target PUCCH cell and a slot of the candidate target PUCCH cell, the candidate target PUCCH cell having a candidate target PUCCH cell slot numerology;
based on the candidate target PUCCH cell and the slot of the candidate target PUCCH cell indicated by the DCI, determine a target PUCCH cell for transmitting the at least one of the SR, the CSI, and the HARQ-ACK, the target PUCCH cell having a target PUCCH cell slot numerology by:
   determining that the slot of the candidate target PUCCH cell indicated by the DCI does not overlap with the determined slot of the reference cell; and
   determining that a primary cell (PCell) or a primary secondary cell group (SCG) cell (PSCell) is the target PUCCH cell;
map the determined slot of the reference cell to a corresponding slot of the target PUCCH cell; and
determine a PUCCH resource for transmitting the at least one of the SR, the CSI, and the HARQ-ACK using the corresponding slot of the target PUCCH cell, the PUCCH resource determination being based on a PUCCH configuration of the target PUCCH cell.

* * * * *